United States Patent
Vandervort et al.

(10) Patent No.: US 11,875,386 B2
(45) Date of Patent: Jan. 16, 2024

(54) ESTIMATING AS-A-SERVICE QUERY PRICES WITHIN OPTIMIZER EXPLAINED PLANS

(71) Applicant: Teradata US, Inc., San Diego, CA (US)

(72) Inventors: Frank Roderic Vandervort, Ramona, CA (US); Louis Martin Burger, Escondido, CA (US); Douglas P. Brown, Rancho Santa Fe, CA (US)

(73) Assignee: Teradata US, Inc., San Diego, CA (US)

( * ) Notice: Subject to any disclaimer, the term of this patent is extended or adjusted under 35 U.S.C. 154(b) by 309 days.

(21) Appl. No.: 17/124,210

(22) Filed: Dec. 16, 2020

(65) Prior Publication Data

US 2021/0406967 A1    Dec. 30, 2021

Related U.S. Application Data

(60) Provisional application No. 63/043,703, filed on Jun. 24, 2020.

(51) Int. Cl.
*G06Q 30/0283* (2023.01)
*G06F 16/2455* (2019.01)
*G06F 16/28* (2019.01)

(52) U.S. Cl.
CPC ..... *G06Q 30/0283* (2013.01); *G06F 16/2455* (2019.01); *G06F 16/284* (2019.01)

(58) Field of Classification Search
CPC .............. G06Q 30/0283; G06F 16/284; G06F 16/2455

See application file for complete search history.

(56) References Cited

U.S. PATENT DOCUMENTS

| | | | |
|---|---|---|---|
| 7,127,456 B1 | 10/2006 | Brown et al. | |
| 10,261,888 B2 | 4/2019 | Brown et al. | |
| 2006/0026176 A1* | 2/2006 | Dettinger | G06Q 30/0283 |
| 2008/0195578 A1* | 8/2008 | Hueske | G06F 16/217 |
| 2021/0124744 A1* | 4/2021 | Gladwin | G06F 16/24545 |

OTHER PUBLICATIONS

Deep et al., QIRANA: A Framework for Scalable Query Pricing, SIGMOD '17: Proceedings of the 2017 ACM International Conference on Management of Data, May 2017, pp. 699-713 (Year: 2017).*

(Continued)

*Primary Examiner* — Rupangini Singh
(74) *Attorney, Agent, or Firm* — Gates & Cooper LLP

(57) ABSTRACT

An apparatus, method and computer program product for estimating as-a-Service (aaS) query prices in a relational database management system (RDBMS). An optimizer of the RDBMS inserts an EXPLAIN modifier into a query, wherein the EXPLAIN modifier results in the optimizer generating a summary of a query execution plan for the query that includes one or more cost estimates for the RDBMS to perform the query. A price estimate for the query is then generated based on the cost estimates, wherein the price estimate is generated using one or more configurable pricing formulae. The price estimate is merged into the summary of the query execution plan for the query. Moreover, a price guarantee may be generated for the price estimate, wherein the price guarantee is honored when the query is subsequently invoked for execution by the RDBMS.

16 Claims, 5 Drawing Sheets

(56) References Cited

OTHER PUBLICATIONS

"Cloud Consumption Pricing for Teradata Vantage™ | Pay-as-You-Go", https://www.teradata.com/Cloud/Pricing/Consumption-Pricing, as downloaded Dec. 15, 2020, pp. 1-6.
"Controlling costs in BigQuery", Google BigQuery User Documentation, cloud.google.com/bigquery/docs/best-practices-costs, as downloaded Dec. 15, 2020, pp. 1-6.
Leis, V., et al., "How Good Are Query Optimizers, Really?", Proceedings of the VLDB Endowment, 2015, pp. 204-215, vol. 9, No. 3.
"Teradata Vantage Advanced SQL Engine", https://www.teradata.com/Products/Software/Database, as downloaded Dec. 15, 2020, pp. 1-5.
Teradata System Emulation Tool User Guide. Release 16.10, Oct. 2018. docs.teradata.com, pp. 1-134.
Teradata Vantage™ SQL Request and Transaction Processing. Release 16.20, Mar. 2019, docs.teradata.com, pp. 1-603.

\* cited by examiner

ESTIMATING AS-A-SERVICE QUERY PRICES WITHIN OPTIMIZER EXPLAINED PLANS

CROSS REFERENCE TO RELATED APPLICATIONS

This application is related to the following co-pending and commonly-assigned application:

U.S. Provisional Patent Application Ser. No. 63/043,703, filed on Jun. 24, 2020, by Frank Roderic Vandervort, Louis Martin Burger, and Douglas P. Brown, and entitled "ESTIMATING AAS QUERY PRICES WITHIN OPTIMIZER EXPLAINED PLANS,";

which application is incorporated by reference herein.

BACKGROUND OF THE INVENTION

1. Field of the Invention

This invention relates to methods and systems for estimating as-a-service query prices within optimizer-explained query execution plans.

2. Description of Related Art (Note: This application references a number of different publications as indicated throughout the specification by one or more reference numbers within brackets [x]. A list of these different publications ordered according to these reference numbers can be found below in the section entitled "References." Each of these publications is incorporated by reference herein.)

Cloud-based database vendors are increasingly offering pay-as-you-go pricing models as part of their as-a-Service (aaS) offerings. The recently introduced Teradata® Vantage Consumption™ feature is one such offering. Such pricing is typically done per-query according to a formula based on the amount of system resources used and/or the amount of data accessed.

While customers appreciate the flexibility provided by consumption-based pricing [1], they often find it difficult to predict the charges for experimental queries and have little insight on how to make them more cost efficient. It is not uncommon for queries under development to "runaway" after submission due to a lack of filtering conditions or inadequate physical tuning. Although the queries can be manually aborted by the customer, the customer is still typically charged for the queries.

Although these services allow customers to view and validate their billed usage, these services offer only primitive methods for estimating the price of an individual query prior to executing the query and committing to pay for the query. Having a robust query price estimator tool would alleviate the concerns of cost-conscious customers and encourage customers to experiment with new queries and ultimately drive more revenue for database vendors.

Although a query price estimator tool would certainly help, there is still a risk of the actual price being much greater as the cost of queries is notoriously difficult to estimate. While customers understand the limitation of such estimates, customers would prefer that database vendors stand behind their estimates, much like a binding quote or bid in other business domains.

Lastly, one of the most appealing features of cloud-based database systems is the elasticity these systems provide with respect to capacity and configuration. In some cases, the choice of configuration can have a significant impact on query pricing, so customers would greatly benefit from "what-if" pricing mode for hypothetical configurations.

Thus, there is a need in the art for improved methods and systems for estimating as-a-service query prices within optimizer explained plans. The present invention satisfies this need.

SUMMARY OF THE INVENTION

One or more embodiments of the invention provides an apparatus, method and computer program product for estimating as-a-Service (aaS) query prices in a relational database management system (RDBMS). An EXPLAIN modifier is inserted into a query wherein the EXPLAIN modifier results in the cost estimates being computed by an optimizer of the RDBMS from one or more resource usage categories taken from one or more cost models. A price estimate for the query is then generated based on the cost estimates, wherein the price estimate is generated from one or more configurable pricing formulae using the cost estimates computed from the resource usage categories taken from the cost models. The price estimate is merged into the summary of the query execution plan for the query. Moreover, a price guarantee may be generated for the price estimate, wherein the price guarantee is honored when the query is subsequently invoked for execution by the RDBMS.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

This invention provides a solution that integrates a query price estimator within an existing EXPLAIN function of an RDBMS, thereby providing even more value by allowing customers to display and understand price estimates for queries before the queries are executed by the RDBMS.

The EXPLAIN function provides detailed information about a query that is generated by an optimizer of the RDBMS. Generally, the information describes the criteria used to choose a query execution plan for the query. In addition, the information may include the sequence of operations being performed, predicates and selectivity estimates for each predicate, statistics for all objects referenced in the query execution plan, as well as cost information. The EXPLAIN function is invoked by adding an EXPLAIN modifier to the structured query language (SQL) statements of the query.

Using this pricing information, customers can potentially rewrite or tune their queries to maximize their return on investment. This invention also offers some novel enhancements to query price estimations in the form of system-offered price guarantees on selected queries and "what-if" query pricing estimations for simulated systems.

Hardware and Software Environment

Figure 1:
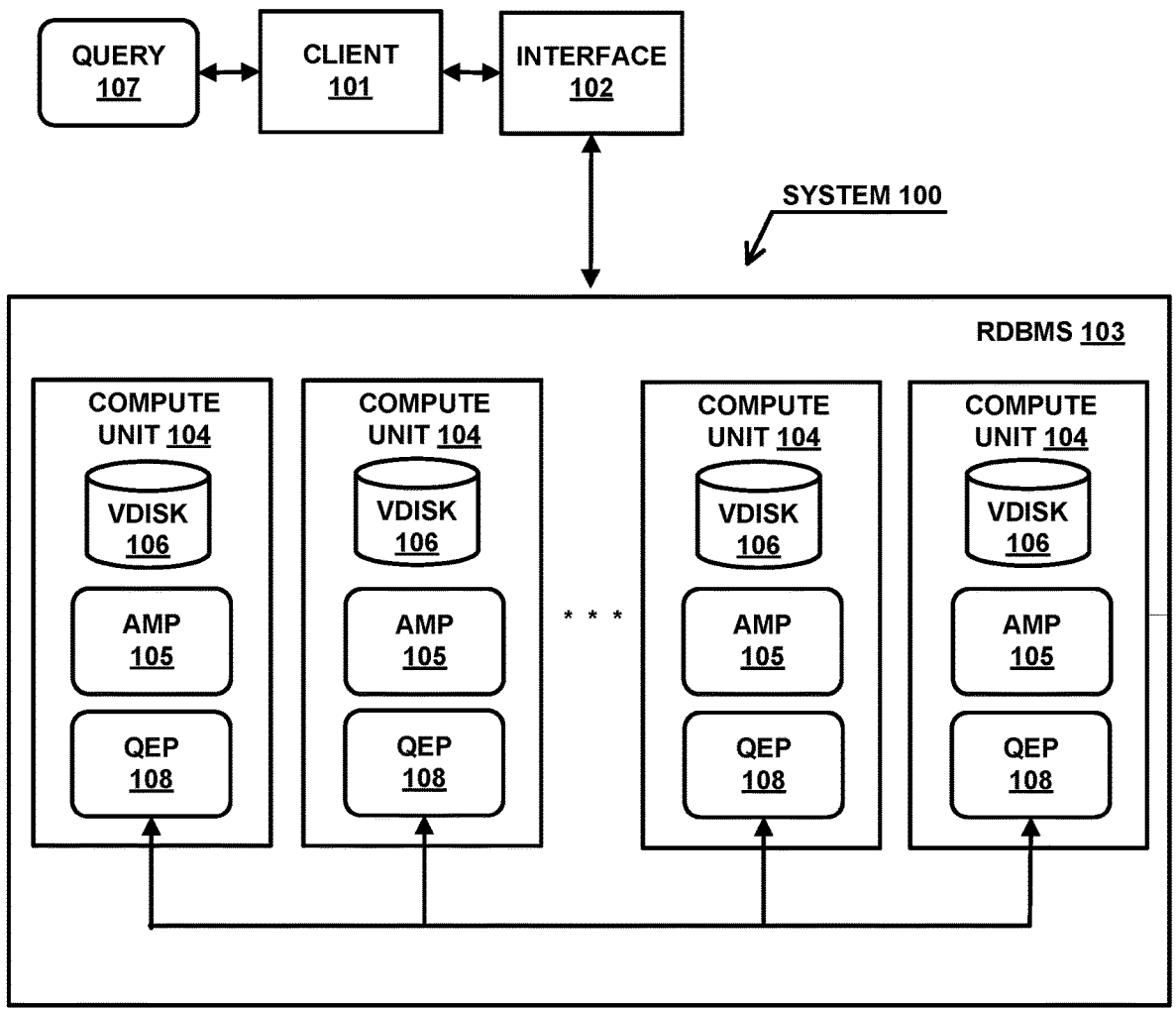
FIG. 1 illustrates an exemplary hardware and software environment according to the preferred embodiment of the present invention.

FIG. 1 illustrates an exemplary hardware and software environment according to one embodiment of the present invention. In the exemplary environment, a computer system 100 implements a data warehouse in a three-tier client-server architecture, wherein the first or client tier provides clients 101 that may include, inter alia, a graphical user interface (GUI), the second or middle tier provides an interface 102 for interfacing with the data warehouse, and the third or server tier comprises the data warehouse, which is an RDBMS 103 that stores data and metadata in a relational database. The first, second, and third tiers may be implemented in separate computers, or may be implemented as separate or related processes in a single computer.

In the preferred embodiment, the RDBMS 103 is executed by one or more compute units 104, e.g., processors, in the computer system 100, wherein the RDBMS 103 manages a relational database comprised of one or more tables stored on one or more data storage devices connected to the computer system 100. In one embodiment, the computer system 100 is comprised of one or more access module processors (AMPS) 105 performing the functions of the RDBMS 103 and one or more virtual disks (VDISKs) 106 storing the relational database of the RDBMS 103. The AMPS 105 and VDISKs 106 may be implemented in separate processors, or may be implemented as separate or related processes in a single processor.

The RDBMS 103 used in the preferred embodiment comprises the Teradata® RDBMS sold by Teradata US, Inc., the assignee of the present invention, although other DBMS's could be used. In this regard, the Teradata® RDBMS is a hardware and software based data warehousing and analytic application/database system.

Generally, operators or users of the computer system 100 interact with the clients 101 to formulate a workload comprised of one or more queries 107 for the RDBMS 103, wherein the requests are transmitted via the interface 102 to the RDBMS 103, and responses are received therefrom. The RDBMS 103 performs a workload comprised of one or more queries 107 against a relational database comprised of one or more tables storing data. Specifically, the RDBMS 103 performs the functions described below, including accepting the workload comprised of the queries 107, generating one or more query execution plans (QEPs) 108 from the queries 107, and then performing the QEPs 108 to process data retrieved from the tables. Moreover, the results from these functions may be provided directly to clients 101, or may be provided to other systems (not shown) by the interface 102, or may be stored by the RDBMS 103 in the relational database.

Note that, in one or more embodiments, the computer system 100 may use any number of different parallelism mechanisms to take advantage of the parallelism offered by the multiple tier architecture, the client-server structure of the client 101, interface 102, and RDBMS 103, as well as the multiple compute nodes 104, AMPs 105 and VDISKs 106. Further, data within the relational database may be partitioned across the compute units 104, AMPS 105 and VDISKs 106 to provide additional parallelism.

In one embodiment, each of the compute units 104 manages a portion of the database that is stored in a corresponding one of the VDISKs 106. For example, the rows and/or columns of tables stored in the VDISKs 106 may be partitioned across the compute units 104 to ensure that workloads are distributed evenly across the compute nodes 104. The RDBMS 103 organizes the storage of data and the distribution of rows and/or columns of tables among the compute nodes 104. The RDBMS 103 also coordinates the execution of the query execution plans 108 by the AMPs 105, and the retrieval of data from the VDISKs 106, in response to the queries 107 received from the clients 101.

Generally, the system 100, clients 101, interface 102, RDBMS 103, compute units 104, AMPs 105, VDISKs 106, queries 107 and QEPs 108, comprise hardware and/or software, including logic and/or data tangibly embodied in and/or accessible from a device, media, carrier, or signal, such as RAM, ROM, one or more of the data storage devices, and/or a remote system or device communicating with the computer system 100 via one or more data communications devices. Elements of 101-108 may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Query Processing

Figure 2:
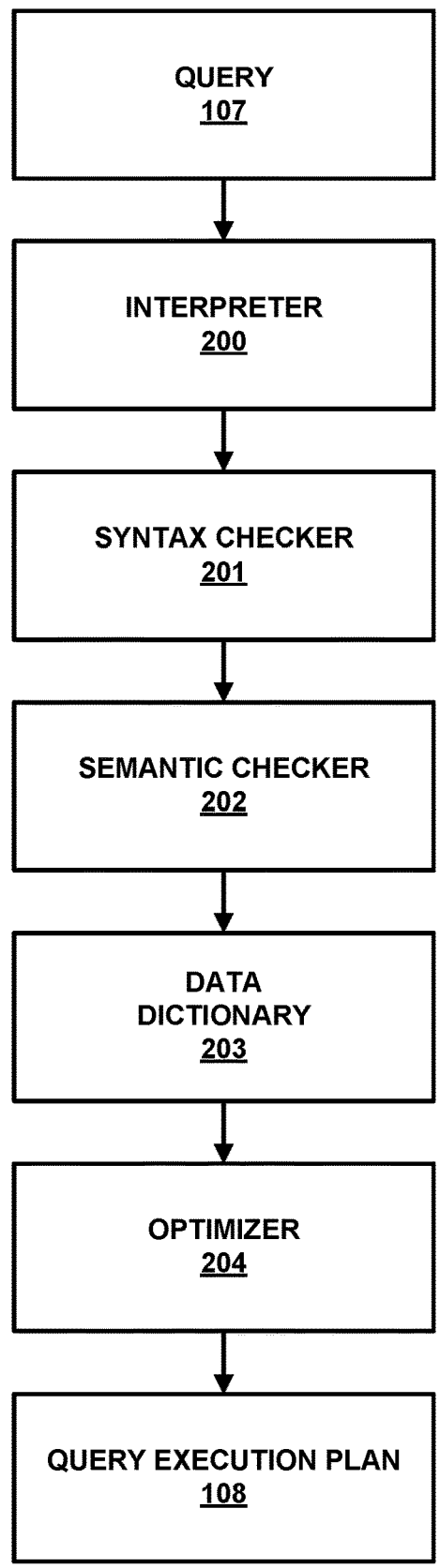
FIG. 2 is a flowchart that illustrates exemplary steps and functions performed by the present invention.

FIG. 2 illustrates the steps or functions performed by the RDBMS 103 when processing a query 107, which typically comprises one or more data manipulation language (DML) statements, such as an SQL query. An interpreter 200 interprets the query 107, a syntax checker 201 checks the query 107 for proper syntax, a semantic checker 202 evaluates the query 107 semantically, and consults a data dictionary 203 to ensure that all of the objects specified in the query 107 actually exist and that the user has the authority to perform the query 107. Finally, an optimizer 204 selects one or more QEPs 108 for the query based on cost profiles, in order to execute an optimal QEP 108 for the query.

In one or more embodiments of this invention, an EXPLAIN modifier is inserted into the query 107, wherein the EXPLAIN modifier results in the optimizer 204 generating a summary of the QEP 108 for the query 107, and the summary includes one or more cost estimates for the RDBMS 103 to perform the query 107. Specifically, the EXPLAIN modifier results in the cost estimates being computed by the optimizer 204 of the RDBMS 103 from one or more resource usage categories taken from one or more cost models. A price estimate is generated for the query 107 based on the cost estimates, wherein the price estimate is generated from one or more configurable pricing formulae using the cost estimates computed from the resource usage categories taken from the cost models. The price estimate is merged into the summary of the QEP 108, which allows a user to display and understand the price estimates for the query 107 before the query 107 is executed by the RDBMS 103, so that the user may rewrite or tune the query 107 based on the price estimate, thereby resulting in the cost and price estimates being used for optimization of the query 107. Moreover, a price guarantee may be generated for the price estimate, wherein the price guarantee is honored when the query 107 is subsequently invoked for execution by the RDBMS 103.

Query Price Estimator Using EXPLAIN

Applying the EXPLAIN modifier [2] to the SQL statements of the query 107 returns a description of the QEP 108 chosen by the optimizer 204, wherein the description is in plain English. In addition to describing the individual execution steps and their inputs, it often includes estimated elapsed times. EXPLAIN-like features are a well-established query 107 performance tuning tool for the RDBMS 103. This invention seeks to build on these proven tools by extending them to include price estimates.

The following shows the output from an example query 107 that includes an EXPLAIN modifier, wherein the output includes the text of the query 107, the number of rows of the explanation returned, the total elapsed time required to execute the query 107 and the explanation output generated by the EXPLAIN modifier, wherein the unformatted text is a typical EXPLAIN output and the bolded text is the newly introduced description in the EXPLAIN output generated by this invention.

An optional IN XML syntax option returns the same output along with organizing XML tags that can be used to more easily parse or shred desired portions of the text.

The estimated elapsed times in EXPLAIN output are computed by the taking the optimizer's 204 estimated resource usage for each step (broken down by various categories such as CPU and I/O) and multiplying them by time cost weight factors. Mature query optimizers 204 use sophisticated cost models to evaluate and select QEPs 108. Such models are designed to estimate all major categories of resource usage incurred when executing the QEPs 108 and typically include I/O (logical and physical), CPU, network costs, and intermediate result (spool) sizes.

A critical observation of this solution is that the optimizer 204 cost model metrics are the same metrics on which query pricing is often based. In the case of the Teradata® Vantage Consumption™ feature [1], resource usage metrics are collected during execution of the QEP 108 and stored in query logs [4] of the RDBMS 103, which in turn serves as input to a query price estimator and billing system. Thus, if this same pricing formula were applied to the optimizer's 204 cost model estimates, it would produce query price estimates as depicted in the bolded text of the EXPLAIN output set forth above, where the currency is expressed as "Vantage Units".

It is important to note that, although this invention is described in the specific context of an SQL-based RDBMS 103 [3], it applies more broadly to any analytics system that provides cost-based optimization for submitted queries.

It is relatively straightforward to implement this invention by extending the EXPLAIN modifier to include new elements or attributes to store optimizer 204 estimates for all resource usage categories. The internal data structure for QEPs 108 that serves as input to the EXPLAIN modifier typically contains all related plan and costing info. As a result, this implementation can easily adapt to ever-changing pricing formulae that emphasize one resource category over another.

---

EXPLAIN

---

SELECT AVG(o_totalprice) FROM tpcd.ordertbl
WHERE o_orderdate BETWEEN current_date - 6 AND current_date;
*** Help information returned. 21 rows.
*** Total elapsed time was 1 second.
Explanation
1) First, we lock tpcd.ordertbl in TD_MAP1 for read on a reserved
RowHash to prevent global deadlock.
2) Next, we lock tpcd.ordertbl in TD_MAP1 for read.
3) We do an all-AMPs SUM step in TD_MAP1 to aggregate from
tpcd.ordertbl by way of an all-rows scan with a condition of
("(tpcd.ordertbl.O_ORDERDATE <= DATE '2010-05-06') AND
(tpcd.ordertbl.O_ORDERDATE >= DATE '2010-04-30')"). Aggregate
Intermediate Results are computed globally, then placed in Spool 3
in TD_Map1. The size of Spool 3 is estimated with high confidence
to be 1 row (31 bytes). The estimated time for this step is 0.29
seconds and the estimated Vantage Units consumed is 10.
4) We do an all-AMPs RETRIEVE step in TD_Map1 from Spool 3 (Last Use)
by way of an all-rows scan into Spool 1 (group_amps), which is
built locally on the AMPs. The size of Spool 1 is estimated with
high confidence to be 1 row (38 bytes). The estimated time for
this step is 0.01 seconds and the estimated Vantage Units consumed is 2.
5) Finally, we send out an END TRANSACTION step to all AMPs involved
in processing the request.
-> The contents of Spool 1 are sent back to the user as the result of
statement 1. The total estimated time is 0.30 seconds
and the total estimated Vantage Units consumed is 12.

Figure 3:
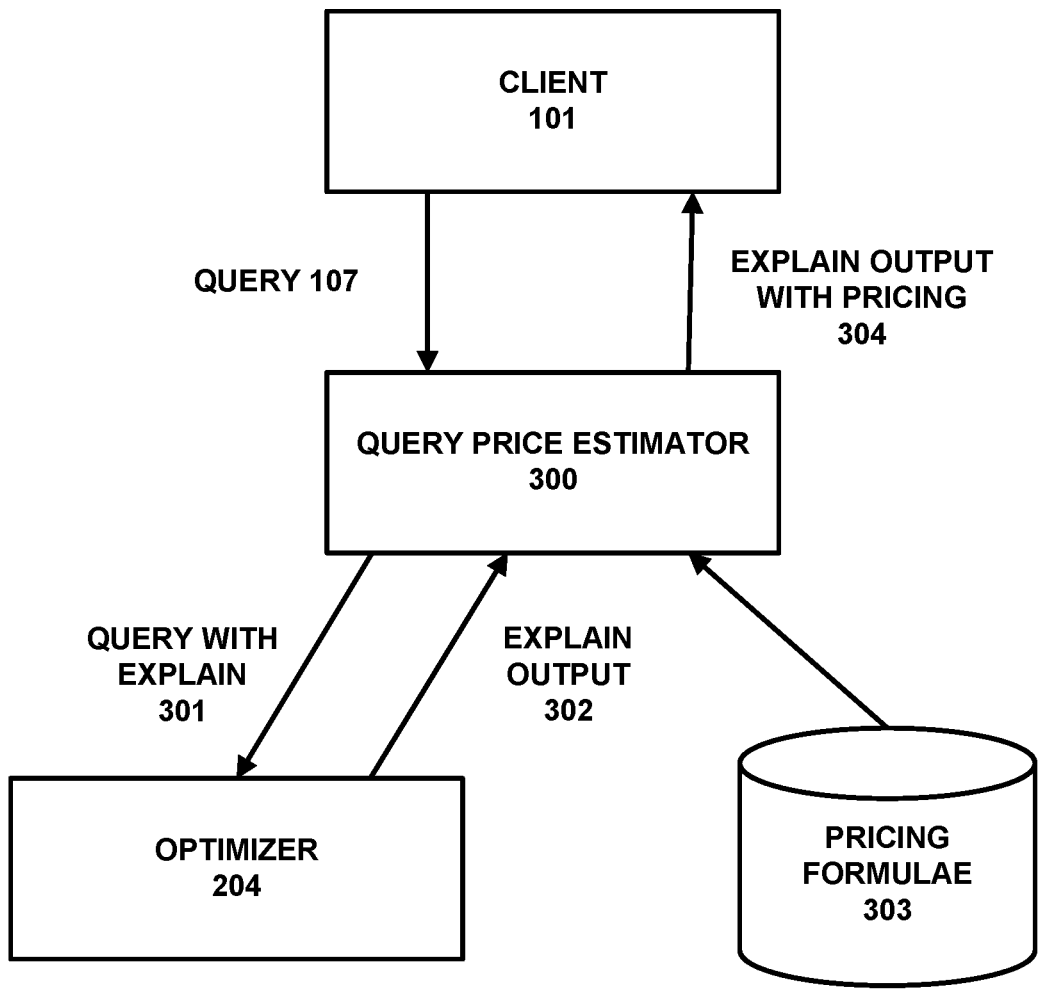
FIG. 3 depicts the architecture for a query price estimator that is external to a relational database management system.

FIG. 3 depicts the architecture for a query price estimator 300 that is external to the RDBMS 103. The query price estimator 300 accepts a query 107 from the client 101 and inserts an EXPLAIN modifier into the query 107, wherein the EXPLAIN modifier may comprise an EXPLAIN IN XML modifier, resulting in a revised query 301.

Alternatively, the query 107 may already include an EXPLAIN modifier, in which case the revised query 301 is identical to the query 107. The revised query 301 is processed by the RDBMS 103, and more specifically, the optimizer 204, generating output 302 that includes the text of the query 107, the number of rows of EXPLAIN output being returned, the total elapsed time required to execute the query 107 and the EXPLAIN output 302. This EXPLAIN output 302 from the revised query 301 is returned to the query price estimator 300, which then fetches pre-configured pricing formulae 303 from a system storage repository, application programming interface, etc. The query price estimator 300 parses resource usage estimates included in the EXPLAIN output 302 and inputs them into the pricing formulae 303 to produce query price estimates that are merged into the EXPLAIN output 302, thereby resulting in EXPLAIN output with pricing 304 for the client 101 that includes customer-visible query-level and step-level price estimates.

Analyzing the EXPLAIN output with pricing 304 can be difficult, but there are tools to help, including Visual Explain™ (VE). The Visual Explain™ tool visually depicts the EXPLAIN output with pricing 304, i.e., the summary of the QEP 108 for the query 107, cost estimates and the price estimate, in a graphical manner, wherein the EXPLAIN output with pricing 304 is broken down into discrete steps showing the flow of data during execution. Moreover, Visual Explain has the ability to compare multiple versions of the EXPLAIN output with pricing 304 side-by-side.

Because the resource usage estimates generated by the optimizer 204 are not always accurate when compared to actual resource usage during runtime [5], customers are at risk of getting charged more than anticipated for a given query 107. To mitigate this risk, and to encourage customers to experiment with new untested queries, the query price estimator 300 offers a "price guarantee" option for those queries 107 where confidence levels are high for the resource usage estimates generated by the optimizer 204. When this price guarantee option is accepted by the customer, a billing system guarantees that the customer is not charged more than the quoted pricing estimate regardless of its actual usage upon execution. Database vendors can limit their exposure to highly underestimated queries 107 by limiting the price guarantee option to identified queries 107.

Figure 4:
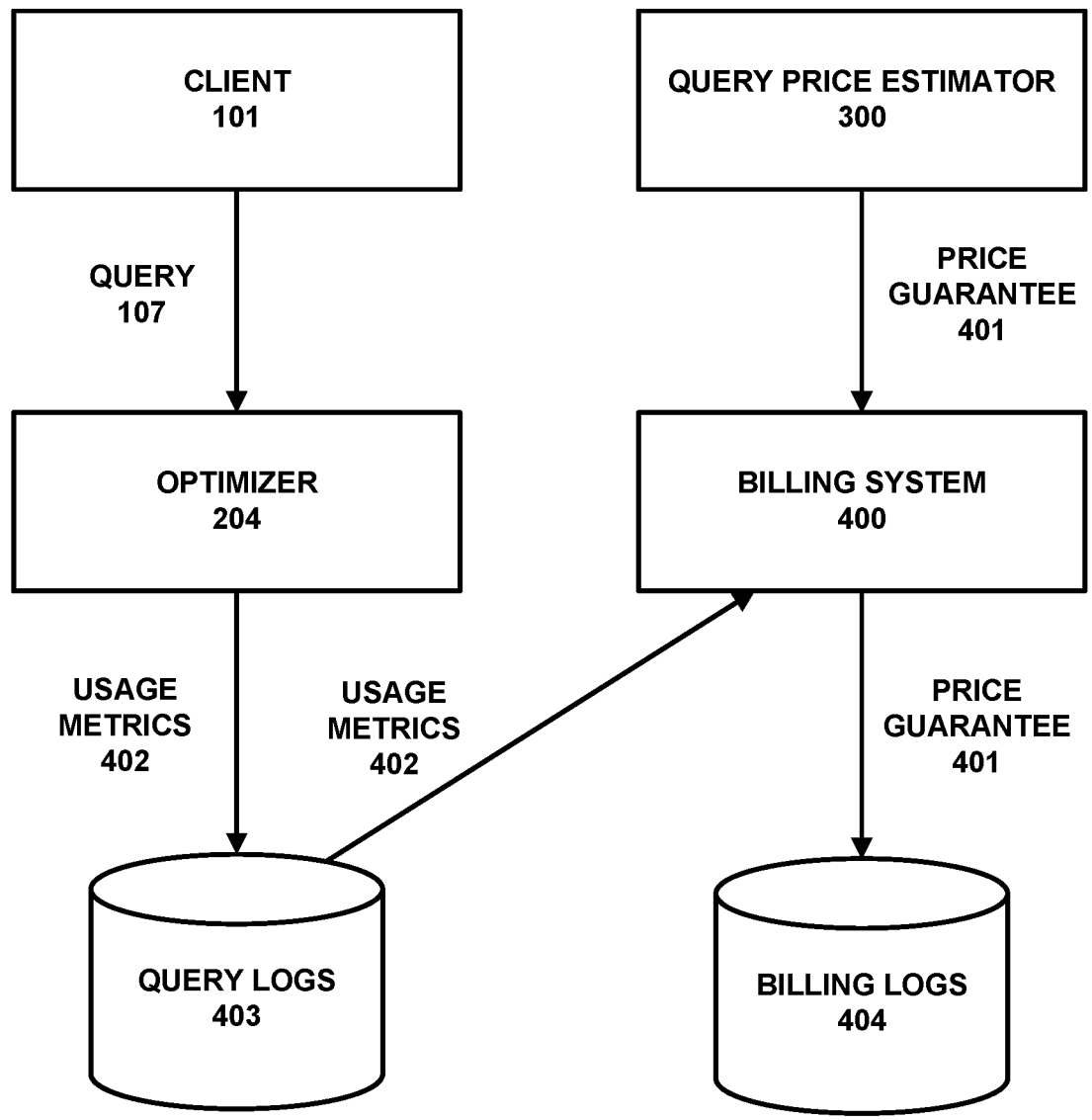
FIG. 4 depicts a price guarantee workflow and interaction between the query price estimator and a billing system to enforce a customer-accepted price guarantee for a query.

FIG. 4 depicts a price guarantee workflow and interaction between the query price estimator 300 and a billing system 400 to enforce a customer-accepted price guarantee 401 for a query 107. In this example, the query 107 is labeled as X, where X represents a unique numeric identifier that is generated by taking the hash of the query 107 text (or syntax tree of the query 107) in a fashion similar to how compiled plans for frequently executed queries 107 are identified and retrieved from a cache. When that same query 107 is subsequently invoked for execution by the client 101, usage metrics 402 from the resulting QEP 108 are collected in one or more query logs 403. The billing system 400 retrieves the usage metrics 402 from the query logs 403, compares the usage metrics 402 with the customer-accepted price guarantee 401 from one or more billing logs 410, and honors the lower price guarantee 401 when necessary.

Many database vendors provide system emulation tools [6] [7] to recreate problems occurring on production (target) systems by exporting their system configuration and importing it onto a non-production (test) system. In addition, such methods can be used by capacity planning tools to simulate and estimate the performance impact of potential configuration changes to a given system. When a special "emulation mode" is turned on for the test system, the optimizer 204 estimates QEP 108 costs as if it were operating on the target system.

Figure 5:
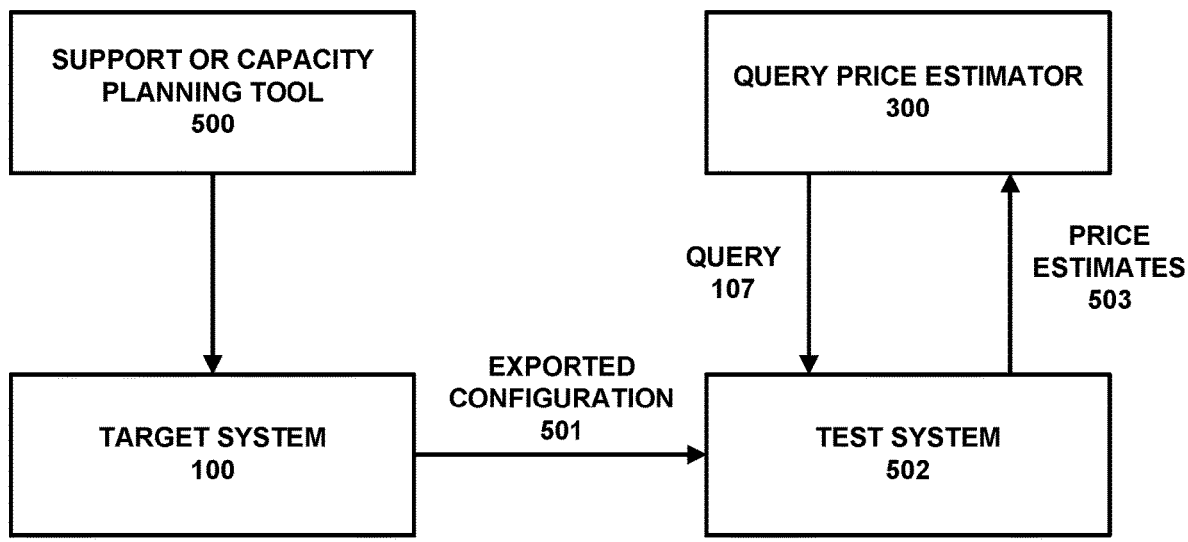
FIG. 5 depicts a support or capacity planning tool interacting with a target system to export its configuration to a separate test system for emulating the target system.

FIG. 5 depicts a support or capacity planning tool 500 interacting with a target system 100 to export its configuration 501 to a separate test system 502 for emulating the target system 100. Once imported onto the test system 502, the optimizer 204 is enabled to run in the previously-described emulation mode. A System Emulation Tool™ enables users to generate and examine the queries 107 and QEPs 108 using the optimizer 204 on the test system 502 as if the queries 107 and QEPs 108 were processed on the target system 100. The System Emulation Tool™ allows users to change test system 502 configuration details, determine the source of various problems arising from the queries 107 and the QEPs 108, and provide an environment that can produce recommendations for a target system 100 workload. The subsequent price estimates 503 for any queries 107 and QEPs 108 submitted to the test system 502 represent "what-if" query price estimates for the target system 100.

Benefits and Advantages

As previously discussed, the EXPLAIN modifier is commonly used in database systems for traditional query performance tuning. In addition, some aaS vendors provide query price estimators. However, there is no known solution that provides an integrated tool designed to optimize both pricing and performance, which is critical as the two are highly related. In addition, this invention uniquely allows query price investigation and tuning to be conducted at the necessary level of granularity, which is the query's individual execution plan steps.

This invention also offers two novel extensions to basic price estimation. The first is in the form of system-offered price guarantees for selected estimated queries. The second is in the form of "what-if" price estimates for emulated system configurations representing the multitude of choices that customers enjoy in quickly provisioning systems in the cloud.

To summarize, this invention includes the following advantages and benefits:

1. A method for extending a traditional query optimizer EXPLAIN tuning tool to include price estimates for pay-as-you-go systems.

2. A method for leveraging optimizer cost models originally designed for plan selection to also provide pricing estimates.

3. A method for combining optimizer cost estimates with configurable pricing formulas.

4. A method for offering system generated price guarantees to customers for a select number of queries.

5. A method for generating "what-if" price estimates for hypothetical system configurations.

REFERENCES

The following publications and patents are incorporated by reference herein:
[1] Consumption Pricing for Teradata Vantage. www.teradata.com/Cloud/Consumption-Pricing.
[2] Teradata Vantage™ SQL Request and Transaction Processing. Release 16.20, March 2019. DOCS.TERADATA.COM.
[3] Teradata Vantage Advanced SQL Engine. www.teradata.com/Products/Software/Database.
[4] U.S. Pat. No. 7,127,456, issued Oct. 24, 2006, to Douglas P. Brown, et al., and entitled "System and method for logging database queries."
[5] Viktor Leis et al. How good are query optimizers, really? Proc. VLDB Endow., 2015.
[6] U.S. Pat. No. 10,261,888, issued Apr. 16, 2019, to Douglas P. Brown, et al., and entitled "Emulating an environment of a target database system."
[7] Teradata System Emulation Tool User Guide. Release 16.10, October 2018. DOCS.TERADATA.COM.
[8] Google BigQuery User Documentation. cloud.google.com/bigquery/docs/best-practices-costs.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method, comprising:
executing a relational database management system (RDBMS) in a computer system, wherein the RDBMS manages a relational database comprised of one or more tables stored on one or more data storage devices connected to the computer system;
accepting a query in the RDBMS;
automatically inserting an EXPLAIN modifier into the query in the RDBMS;
in response to automatically inserting the EXPLAIN modifier into the query in the RDBMS, generating a query execution plan for the query in the RDBMS;
computing one or more cost estimates to perform the query based on the query execution plan in the RDBMS, wherein the EXPLAIN modifier causes an optimizer of the RDBMS to compute the one or more cost estimates from one or more resource usage categories taken from one or more cost models;
generating a summary of the query execution plan for the query in the RDBMS in response to the EXPLAIN modifier, wherein the summary includes the one or more cost estimates for the RDBMS to perform the query;
generating one or more estimates from a query price estimator for the query based on the one or more cost estimates in the RDBMS, wherein the one or more estimates from the query price estimator are merged into the summary of the query execution plan generated in response to the EXPLAIN modifier; and
presenting the summary of the query execution plan to a user for use in optimizing the query.

2. The method of claim 1, wherein the one or more estimates from the query price estimator are generated from one or more configurable formulae using the cost estimates computed from the resource usage categories taken from the cost models.

3. The method of claim 1, wherein the one or more estimates from the query price estimator are generated at the query and step level.

4. The method of claim 1, further comprising generating a guarantee for the one or more estimates from the query price estimator, wherein the guarantee is honored when the query is subsequently invoked for execution by the RDBMS.

5. The method of claim 1, wherein the one or more estimates from the query price estimator are generated for an emulated system configuration.

6. The method of claim 1, further comprising presenting the one or more estimates from the query price estimator to a user before the query is executed by the RDBMS.

7. The method of claim 6, wherein a visual explain tool visually depicts the summary of the query execution plan, the cost estimates and the one or more estimates from the query price estimator.

8. The method of claim 1, further comprising rewriting or tuning the query based on the one or more estimates from the query price estimator.

9. The method of claim 1, wherein the one or more estimates from the query price estimator are used for optimization of the query.

10. The method of claim 1, wherein a system emulation tool enables users to generate and examine queries on a test system, wherein the one or more estimates from the query price estimator represent "what-if" estimates.

11. A computer-implemented apparatus, comprising:
a relational database management system (RDBMS) executing in a computer system, wherein the RDBMS manages a relational database comprised of one or more tables stored on one or more data storage devices connected to the computer system; and
the RDBMS accepting a query;
the RDBMS automatically inserting an EXPLAIN modifier into the query;
in response to automatically inserting the EXPLAIN modifier into the query by the RDBMS, the RDBMS generating a query execution plan for the query;
the RDBMS computing one or more cost estimates to perform the query based on the query execution plan, wherein the EXPLAIN modifier causes an optimizer of the RDBMS to compute the one or more cost estimates from one or more resource usage categories taken from one or more cost models;
the RDBMS generating a summary of the query execution plan for the query in response to the EXPLAIN modifier, wherein the summary includes the one or more cost estimates for the RDBMS to perform the query;
the RDBMS generating one or more estimates from a query price estimator for the query based on the one or more cost estimates, wherein the one or more estimates from the query price estimator are merged into the summary of the query execution plan generated in response to the EXPLAIN modifier; and
the RDBMS presenting the summary of the query execution to a user for use in optimizing the query.

12. The apparatus of claim 11, wherein the one or more estimates from the query price estimator are generated from one or more configurable formulae using the cost estimates computed from the resource usage categories taken from the cost models.

13. The apparatus of claim 11, wherein the one or more estimates from the query price estimator are generated at the query and step level.

14. The apparatus of claim 11, further comprising generating a guarantee for the one or more estimates from the query price estimator, wherein the guarantee is honored when the query is subsequently invoked for execution by the RDBMS.

15. The apparatus of claim 11, wherein the one or more estimates from the query price estimator are generated for an emulated system configuration.

16. A computer program product, the computer program product comprising a non-transitory computer readable storage medium having program instructions embodied therewith, the program instructions executable by a computer system to cause the computer system to perform a method, comprising:

executing a relational database management system (RDBMS) in a computer system, wherein the RDBMS manages a relational database comprised of one or more tables stored on one or more data storage devices connected to the computer system;

accepting a query in the RDBMS;

automatically inserting an EXPLAIN modifier into the query in the RDBMS;

in response to automatically inserting the EXPLAIN modifier into the query in the RDBMS, generating a query execution plan for the query in the RDBMS;

computing one or more cost estimates to perform the query based on the query execution plan in the RDBMS, wherein the EXPLAIN modifier causes an optimizer of the RDBMS to compute the one or more cost estimates from one or more resource usage categories taken from one or more cost models;

generating a summary of the query execution plan for the query in the RDBMS in response to the EXPLAIN modifier, wherein the summary includes the one or more cost estimates for the RDBMS to perform the query;

generating one or more estimates from a query price estimator for the query based on the one or more cost estimates in the RDBMS, wherein the one or more estimates from the query price estimator are merged into the summary of the query execution plan generated in response to the EXPLAIN modifier; and presenting the summary of the query execution to a user for use in optimizing the query.

\* \* \* \* \*